United States Patent [19]

Kawamura

[11] Patent Number: 5,353,204

[45] Date of Patent: Oct. 4, 1994

[54] VEHICULAR HEADLAMP ASSEMBLY HAVING AUXILIARY LAMP

[75] Inventor: Naoshi Kawamura, Shizuoka, Japan

[73] Assignee: Koito Manufacturing Co., Ltd., Tokyo, Japan

[21] Appl. No.: 132,273

[22] Filed: Oct. 6, 1993

[30] Foreign Application Priority Data

Mar. 8, 1993 [JP] Japan ................................. 5-46222

[51] Int. Cl.⁵ ............................................. B60Q 1/18
[52] U.S. Cl. ...................................... 362/61; 362/230;
362/240; 362/245; 362/299; 362/309; 362/328;
362/336
[58] Field of Search ................... 362/61, 80, 83, 83.3,
362/230, 231, 240, 242, 243, 245, 252, 297, 299,
328, 331-334, 336-340, 309, 310, 346, 329, 249

[56] References Cited

U.S. PATENT DOCUMENTS

| | | | |
|---|---|---|---|
| 2,041,315 | 5/1936 | Barclay | 362/83 |
| 2,064,253 | 12/1936 | Fortney | 362/299 |
| 2,165,305 | 7/1939 | Ruths | 362/299 |
| 3,032,645 | 5/1962 | Wilfert | 362/83 |
| 4,198,674 | 4/1980 | Ilhage et al. | 362/240 |
| 4,727,458 | 2/1988 | Droste et al. | 362/61 |
| 4,912,606 | 3/1990 | Yamamoto | 362/61 |
| 5,081,564 | 1/1992 | Mizoguchi et al. | 362/61 |
| 5,140,504 | 8/1992 | Sato | 362/61 |
| 5,156,445 | 10/1992 | Sato | 362/61 |
| 5,172,972 | 12/1992 | Terao | 362/61 |

FOREIGN PATENT DOCUMENTS

| | | | |
|---|---|---|---|
| 1101984 | 3/1961 | Fed. Rep. of Germany | 362/240 |
| 1297062 | 6/1969 | Fed. Rep. of Germany | 362/61 |
| 5-166402 | 7/1993 | Japan | 362/240 |

Primary Examiner—Ira S. Lazarus
Assistant Examiner—Alan Cariaso
Attorney, Agent, or Firm—Sughrue, Mion, Zinn, Macpeak and Seas

[57] ABSTRACT

A vehicular headlamp assembly with an auxiliary lamp which is small in size and does not require the provision of a special mounting space. A lamp chamber is defined by a generally capsule-shaped lamp body and a transparent front cover applied to the front opening of the lamp body, a reflection or projection lamp for forming a normal running beam, a projection lamp for forming a passing light beam, and an auxiliary lamp are disposed side by side within the lamp chamber, and a mirrored-surface inner cover having an opening through which the front end of the projection lamp is exposed. A bulb for the auxiliary lamp supported by the lamp body is disposed at a position located aslant on the side of the projection lens when viewed from the front in a state such that the bulb is directed forward. The lower edge of the inner cover corresponding to the bulb is substantially horizontally extended to form a horizontal extended part. A hole from which the front end of the bulb for the auxiliary lamp is projected is formed in the horizontal extended part, and a lens for the auxiliary lamp having a lens (prism) step area formed thereon for guiding light beams from the bulb in a given direction is mounted in the hole.

9 Claims, 5 Drawing Sheets

VEHICULAR HEADLAMP ASSEMBLY HAVING AUXILIARY LAMP

BACKGROUND OF THE INVENTION

The present invention relates to a headlamp assembly for motor vehicles, and more particularly to a vehicular headlamp assembly including an auxiliary lamp in which an auxiliary lamp, such as a clearance lamp, is mounted in a lamp chamber.

FIG. 10 is a horizontal sectional view showing a conventional headlamp assembly as disclosed, for example, in Published Unexamined Japanese Utility Model Application No. Hei. 3-77735. As shown therein, a normal driving beam lamp 3, a fog lamp 4, and a clearance lamp 5 are disposed within a lamp chamber defined by a lamp body 1 and a front lens 2. The normal beam lamp 3 is constructed with a bulb $a_1$ and a parabolic reflector $b_1$. The fog lamp 4 is constructed with a bulb $a_2$ and a parabolic reflector $b_2$. The clearance lamp 5 is constructed with a bulb $a_3$ and a parabolic reflector $b_3$. To obtain desired quantities of light from the lamps, certain minimum sizes of the reflectors $b_1$, $b_2$, and $b_3$ of the lamps 3, 4 and 5 are required. This constitutes one of the factors hindering a reduction in the size of the headlamp assembly.

U.S. Pat. No. 4,727,458 proposes a headlamp assembly of this type utilizing a projection structure having a reduced size. In this approach, as shown in attached FIG. 11, light emitted from a bulb $a_4$ is converged by a reflector c which is substantially parabolic in cross section. The light beams are then projected forwardly by a projection lens d. Reference numeral 6 designates a front cover, and reference numeral 7 indicates an inner cover with a mirrored surface, which is disposed around the projection lens d of the projection unit. The inner cover 7 keeps the interior of the lamp chamber from sight, and provides a brilliant appearance. A bulb $a_5$ is used for a position lamp such as a parking light. The bulb $a_5$ projects forwardly from the inner cover 7. The light emitted from the bulb $a_5$ is reflected by a predetermined reflecting area 7a of the inner cover 7 and forwardly distributed.

In the structure shown in FIG. 10, the lamps 3, 4 and 5 of the reflection type having the parabolic reflectors are all disposed within the lamp chamber. Accordingly, there is a limit in reducing the size of the headlamp assembly. If the lamp of the projection type as shown in FIG. 11 is used, a limit in size reduction still exists because the clearance lamp 5 is large.

In the structure shown in FIG. 11, the bulb $a_5$ is located in the upper portion of the lamp body, increasing the height of the lamp body. This hinders the size reduction of the headlamp assembly.

SUMMARY OF THE INVENTION

For the above reasons, the present invention has an object to provide a vehicular headlamp assembly with an auxiliary lamp which is small in size.

To achieve the above object, there is provided a vehicular headlamp assembly with an auxiliary lamp in which a lamp chamber is defined by a capsule-shaped lamp body and a transparent front cover applied to the front opening of the lamp body, a reflection or projection lamp for forming a normal running light beam, a projection lamp for forming a passing beam, and an auxiliary lamp are disposed side by side within the lamp chamber, and a mirrored inner cover having an opening through which the front end of the projection lamp is exposed, wherein a bulb for the auxiliary lamp supported by the lamp body is disposed at a position located aslant on the side of the projection lens when viewed from the front in a state such that the bulb is directed forward, the lower edge of the inner cover corresponding to the bulb is substantially horizontally extended to form a horizontal extended part, a hole from which the front end of the bulb for the auxiliary lamp is projected is formed in the horizontal extended part, and a lens for the auxiliary lamp having a prism step area formed thereon for guiding light beams from the bulb in a given direction is mounted in the hole.

The vertical and horizontal dimensions of the projection lamp are smaller than those of the reflection lamp. Within the lamp chamber, a given space is provided at a place located aslant on the side of the projection lens even if another lamp is present adjacent thereto. A bulb for the auxiliary lamp, directed forward, is disposed in this space. Further, the front end of the bulb for the auxiliary lamp is projected from the hole formed in the horizontal extended part of the inner cover. This construction eliminates the need of specially increasing the size of the lamp body for containing the auxiliary lamp. Accordingly, a significant size reduction of the headlamp can be achieved. Further, the lens step area of the lens for the auxiliary lamp guides the light beams emitted from the bulb for the auxiliary lamp in a given direction. Accordingly, the auxiliary lamp when lit is well distinguished.

DESCRIPTION OF THE PREFERRED EMBODIMENTS

Preferred embodiments of the present invention will be described with reference to the attached drawings.

Figure 1:
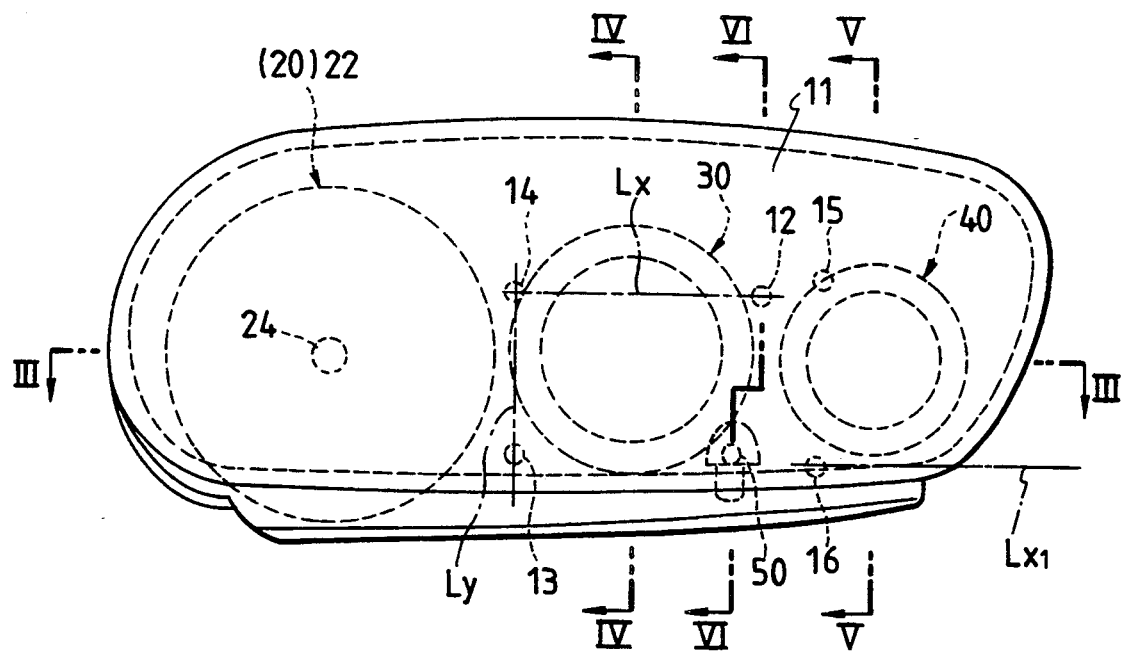
FIG. 1 is a front view showing a vehicle headlamp assembly with an auxiliary lamp according to an embodiment of the present invention.
Figure 2:
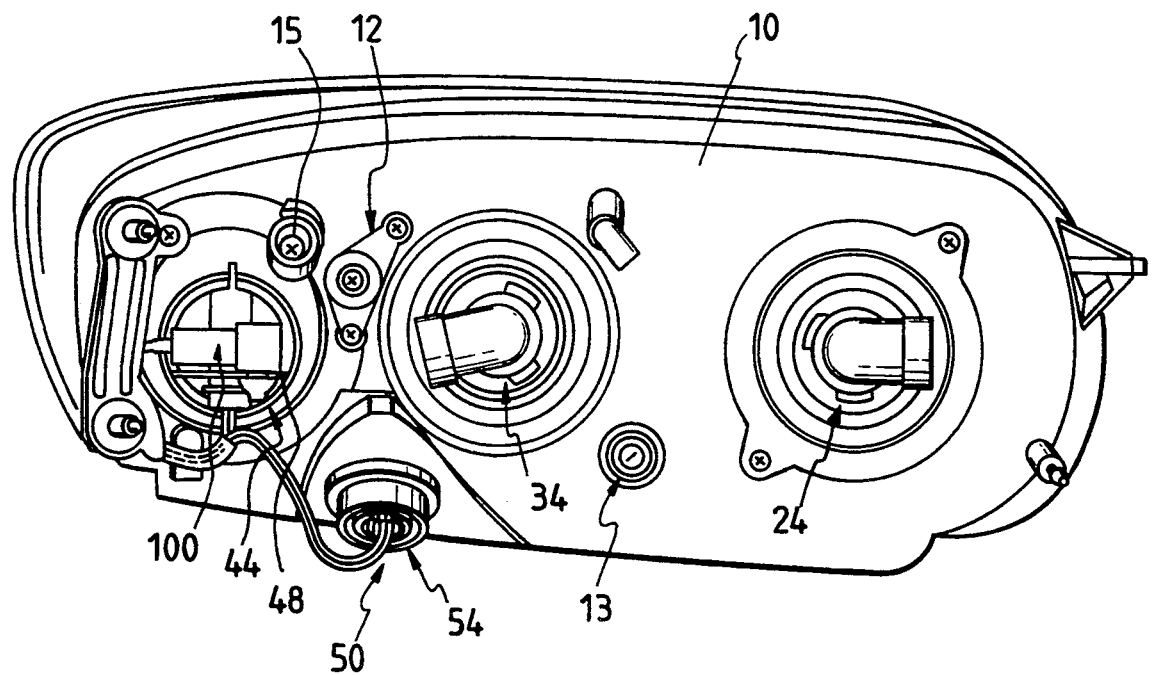
FIG. 2 is a rear view showing the rear side of the headlamp assembly shown in FIG. 1.
Figure 3:
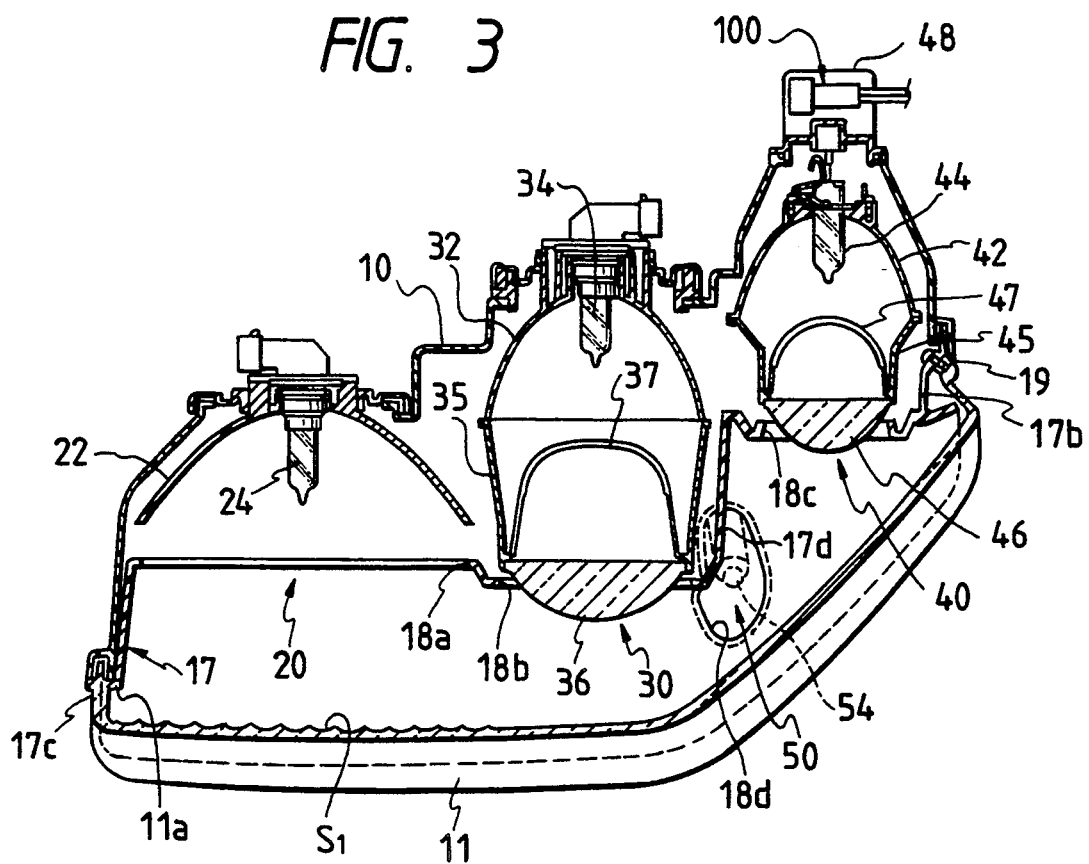
FIG. 3 horizontal sectional view of the headlamp assembly (cross-sectional view taken on a line III—III in FIG. 1)
Figure 4:
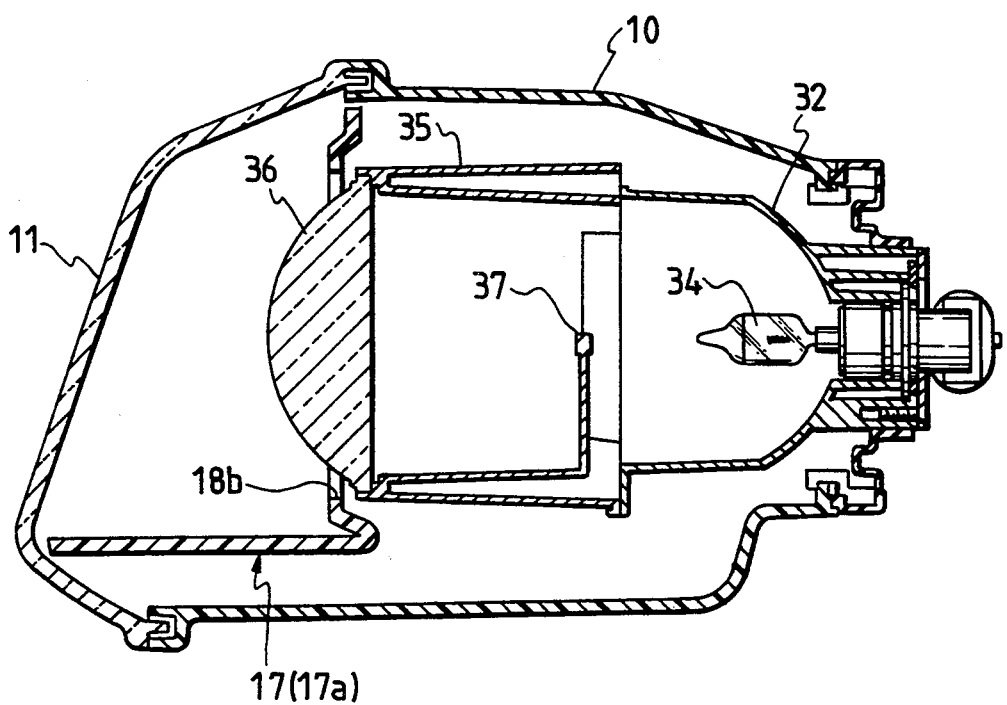
FIG. 4 is a longitudinal sectional view of the headlamp assembly (cross-sectional view taken on a line IV—IV in FIG. 1)
Figure 5:
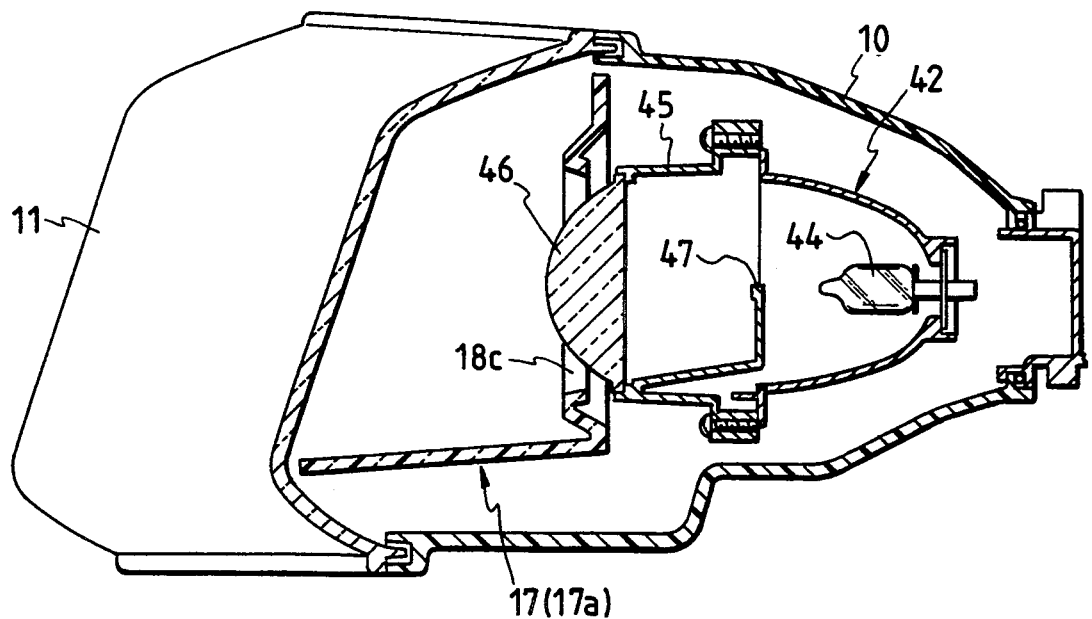
FIG. 5 is a longitudinal sectional view of the headlamp assembly (cross-sectional view taken on a line V—V in FIG. 1)
Figure 6:
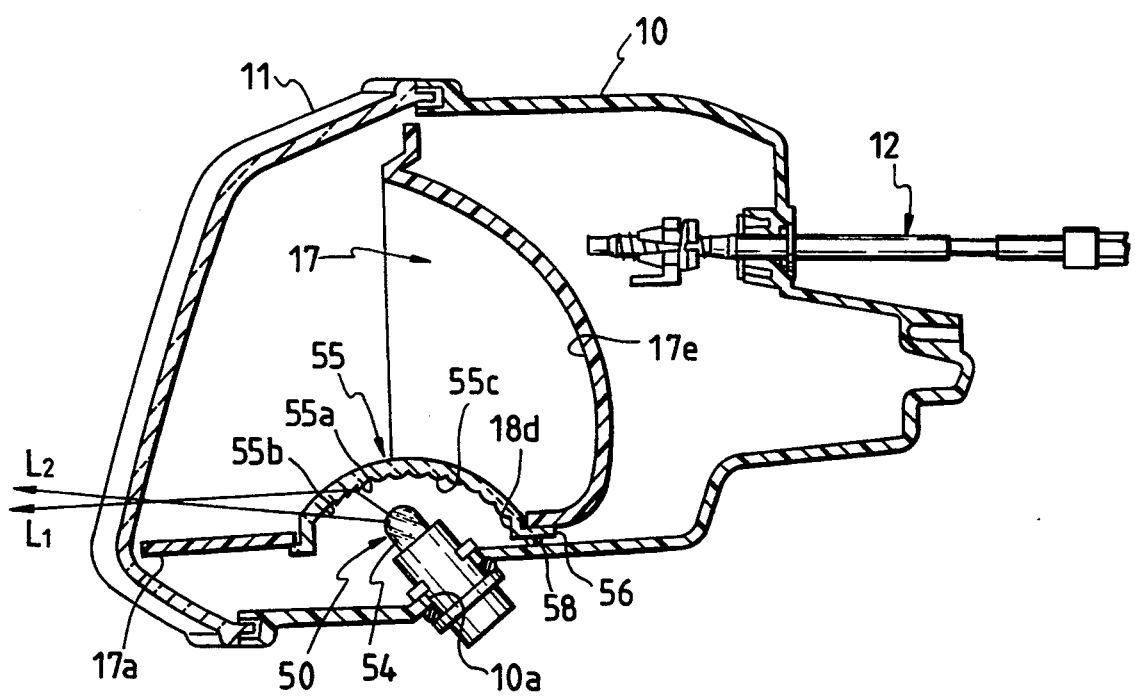
FIG. 6 is a longitudinal sectional view of the headlamp assembly (taken on a line VI—VI in FIG. 1)
Figure 7:
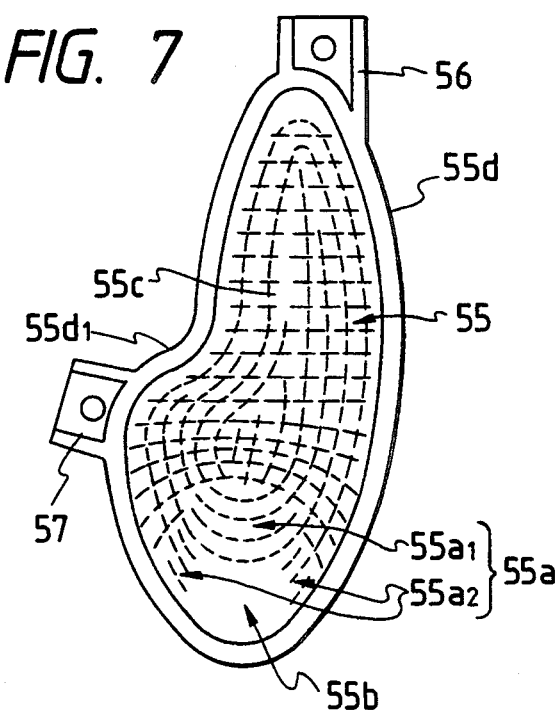
FIG. 7 is a plan view showing a lens for a clearance lamp.
Figure 8:
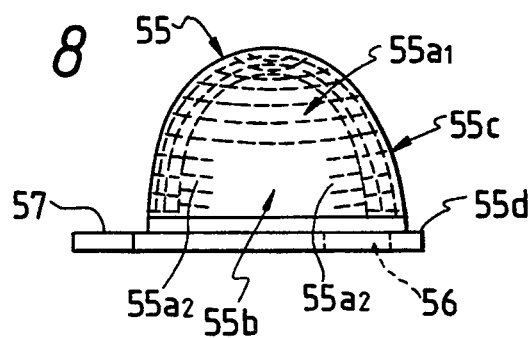
FIG. 8 is a front view showing a lens for a clearance lamp.
Figure 9:
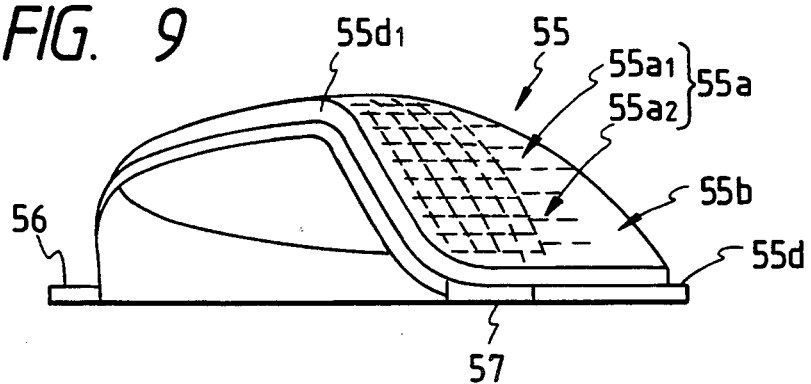
FIG. 9 is a left side view showing a lens for a clearance lamp.
Figure 10:
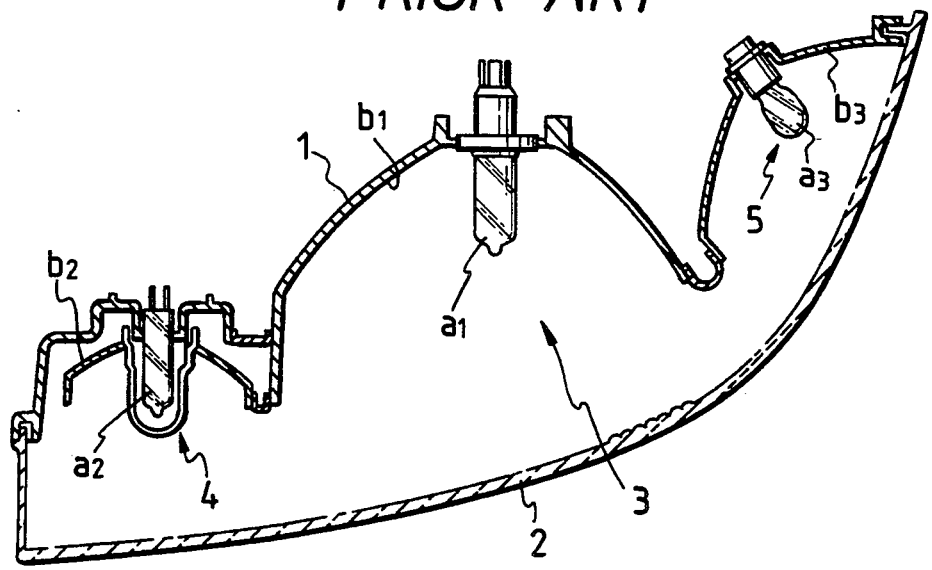
FIG. 10 is a horizontal sectional view showing a conventional headlamp assembly.
Figure 11:
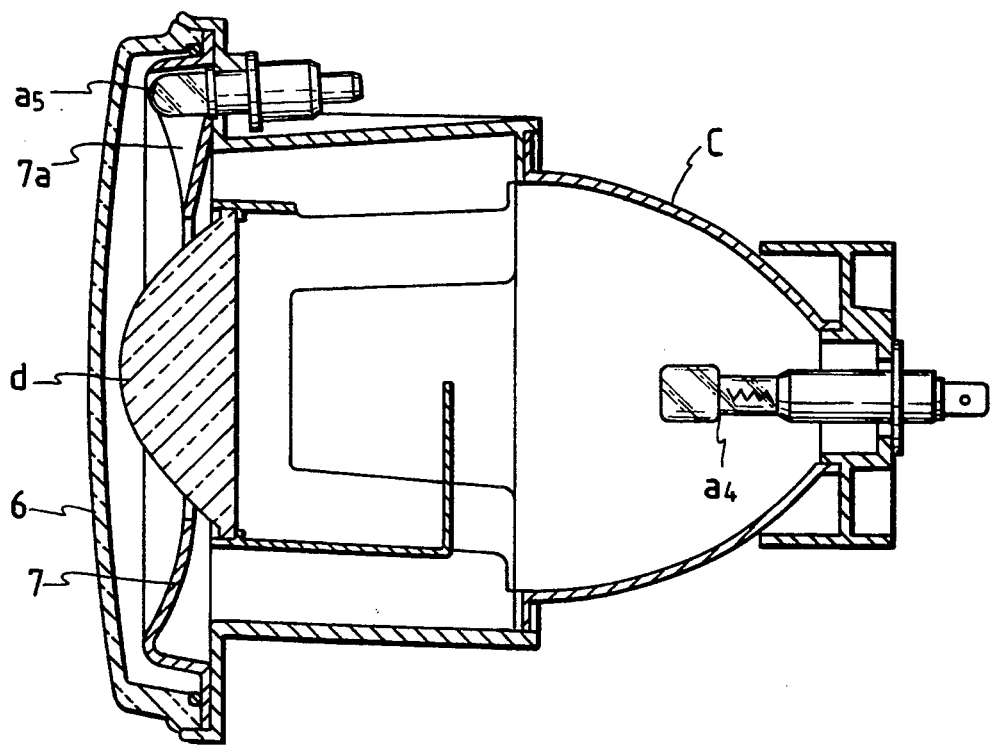
FIG. 11 is a cross-sectional view showing another conventional headlamp assembly utilizing a projection structure having a reduced size.

In FIGS. 1 through 9 showing a preferred embodiment of the present invention, FIG. 1 is a front view showing a vehicular headlamp assembly with an auxiliary lamp, FIG. 2 is a rear view showing the rear side of the headlamp assembly shown in FIG. 1, FIG. 3 is a horizontal sectional view of the headlamp assembly (cross-sectional view taken on a line III—III in FIG. 1), FIG. 4 is a longitudinal sectional view of the headlamp assembly (cross-sectional view taken on a line IV—IV in FIG. 1), FIG. 5 is longitudinal sectional view of the headlamp assembly (cross-sectional view taken on a line V—V in FIG. 1), and FIG. 6 is a longitudinal sectional view of the headlamp assembly (taken on a line VI—VI in FIG. 1), and FIGS. 7, 8 and 9 are plan, front, and left side views showing a lens for clearance lamp.

In these figures, a generally capsule-shaped lamp body 10 opens to the front. A transparent front cover 11 curved rearwardly at the circumferential edge is applied to the front opening of the lamp body 10, thereby forming a lamp chamber outwardly curved from the front side. A reflection lamp 20 for forming a normal running beam, a projection lamp 30 for forming a passing beam, and a projection-type fog lamp 40 are disposed side by side within the lamp chamber. Further, a clearance lamp 50 of the reflection type is located between the projection lamp 30 and the fog lamp 40.

The reflection lamp 20 is formed of a reflector 22 and a bulb 24 inserted into the reflector 22. In this embodiment, the reflector 22, circular when seen from the front, has the shape of a paraboloid of revolution. The light beams that are reflected by the reflector 22 and guided forwardly are horizontally diffused to produce a desired light distribution pattern by the cylindrical step area $S_1$ acting as a light distribution control step area formed in the front cover 11. The configuration of the light distribution control step area (cylindrical step area) $S_1$ formed on the front cover 11 depends on the curved surface of the reflecting surface of the reflector 22. In the case of a reflector having reflecting surface of curvatures different for each area so as to guide the reflecting light beams in a given direction (viz., a reflecting surface so shaped as to have a plural number of light distribution control curved surfaces), there is no need of the light distribution control step area.

The lamps 30 and 40 include respective reflectors 32 and 42, bulbs 34 and 44, and projection lenses 36 and 46. The reflectors 32 and 42 are substantially parabolic shaped. Each reflector 32 has a smaller opening diameter than the reflector 22 of the reflection lamp 20. The bulbs 34 and 44 are inserted into the reflectors 32 and 42. The projection lenses 36 and 46, circular when seen from the front, are mounted above the front openings of the reflectors 32 and 42 by means of lens holders 35 and 45. Reference numerals 37 and 47 designate shades that are integral with the lens holders 35 and 45. The shades are mounted upright at positions near the focal positions of the projection lenses 36 and 46. The shades 37 and 47 intercept the light beams that are reflected by the reflectors 32 and 42 and pass to the projection lenses 36 and 46, thereby forming predetermined light distribution patterns.

When the lamps 20 and 30 are lit simultaneously, the light distribution patterns formed by those lamps are composed into a normal running beam. Where only the lamp 30 is lit, a passing beam is formed. Where the normal running beam is formed by lighting only the reflection lamp 20, the projection lamp 30 is used only for forming the passing beams.

The projection lamp 30 is supported to be tiltable with respect to the lamp body 10 by means of one ball joint 14 and two aiming screws 12 and 13 that extend forwardly and are rotatably supported by the rear wall of the lamp body 10. The projection lamp 30 is tiltable about the vertical axis $L_y$ and the horizontal axis $L_x$ through the rotation of the aiming screws 12 and 13, thereby tilting the optical axis of the projection lamp 30 horizontally and vertically. The fog lamp 40 is supported to be tiltable with respect to the lamp body 10 by means of a ball joint 16 and an aiming screw 15 that extends forwardly and is rotatably supported by the rear wall of the lamp body 10. The fog lamp 40 is tiltable only about the horizontal axis $L_{x1}$, so that it is able to tilt the optical axis of the fog lamp 40 only vertically.

An inner cover 17, provided inside the front opening of the lamp body 10, has circular openings 18a, 18b and 18c located corresponding to the reflector 22 of the reflection lamp 20, and it receives the projection lenses 36 and 46 of the lamps 30 and 40. The obverse side of the inner cover 17, like the reflector 22, is coated with aluminum by a vapor deposition process (mirror processed). The outer edge of the inner cover 17 is profiled so as to fit the front opening of the lamp body 10. The lower part (lower edge) 17a of the inner cover 17, located under the circular openings 18a, 18b and 18c, is extended horizontally and forwardly to a location near the front cover 11. The inner cover 17 conceals the peripheral regions of the lamps 20, 30, and 40, and also provides a good appearance for the entire light chamber, having a single mirror-like color. A rearward extended part 17b (FIG. 3) is rearward extended from the right end part of the inner cover as viewed from the front, and is fixed to the leg of the front cover 11 by means of a screw 19. A sideward extended part 17c is sideward extended from the left end part of the inner cover 17. The sideward extended part 17c is fixed by the front end of the inner wall of a seal groove and the stepped part 11a of the front cover 11.

The clearance lamp 50 is constructed with a bulb 54, which is inserted into a bulb insertion hole 10a of the lamp body 10 in a state where it is forwardly projected, and a light distribution control lens 55 mounted for a hole 18d of a horizontal extended part 17a of the inner cover 17. As shown in FIGS. 6 through 9, the lens 55 curves upward to have a shape like an egg cut in half longitudinally. The circumferential outer edge 55d of the lens 55 matches the hole 18d of the inner cover 17. A part of the hole 18d overlaps with the part 17d between the curved openings 18b and 18c of the inner cover 17. A part $55d_1$ of the lens outer edge 55d is upward curved. A prism step area 55a ($55a_1$, $55a_2$), a plain area 55b, and a fisheye step forming area 55c are formed on the rear side of the lens 55, which engages the hole 18d of the inner cover in an upward protruded state. The prism step area 55a is provided for turning light beams emitted from the bulb 54 in a given direction $L_1$ (e.g., turned 10° downward), as shown in FIG. 6. The plain area 55b allows the light beams from the bulb 54 to pass straight therethrough in the direction $L_2$ in FIG. 6. The fisheye step forming area 55c guides the light beams from the bulb 54 in a diffused state to the concave surface 17e of the inner cover 17, thereby lighting up the clearance lamp and its surrounding. The concave surface 17e of the inner cover 17 also serves as a reflector of the clearance lamp 50. The prism step area 55a and the fisheye step forming area 55c keep the surrounding of the bulb 54 from sight, thereby providing a good overall appearance. Brackets 56 and 57, extended from the outer edge of the lens, are fastened to the outer edge of the hole 18d of the inner cover by means of screws 58.

When the vehicle headlamp assembly is mounted on a motor vehicle, the fog lamp 40 is located closer to the outer side of the vehicle and more rearward than the projection lamp 30 adjacent thereto. The light distribution control lens 55 of the clearance lamp 50 is located on the side of the projection lamp 30 and on the forward side of the fog lamp 40. Accordingly, the light beam from the clearance lamp 50 is distributed not only forward but also sideward with a sufficient quantity of light.

In FIGS. 2 and 3, reference numeral 100 designates a power feed connector for feeding electric power to the bulb 44 for the fog lamp and the bulb 54 for the clearance lamp. The power feed connector 100 is inserted and fastened to a lateral plate 48 as an extension from the rear end of a socket of the bulb 44. The lead wires extending from the bulbs 44 and 54 are bundled together and fastened to the power feed connector 100.

In the above-discussed embodiment, the clearance lamp 50 is disposed in a space between and under the projection lamps 30 and 40 within the lamp chamber. Alternatively, it may be disposed in a space between and above the lamps 30 and 40. Where the aiming screws 12 and 13 and the one ball joint 14, which make up an aiming mechanism are located at other positions than those in this embodiment and a given space is formed between and above or below the lamps 30 and 20 or between and above the lamps 30 and 40, the clearance lamp 50 may be disposed in that space.

In a case where the clearance lamp is mounted in a space located on the side of and above the projection lamp 30, the upper edge portion of the inner cover 17 corresponding to the location where the clearance lamp 50 is mounted is extended forwardly and horizontally. A hole is formed in this extended part. The clearance lamp is inserted through the hole and projected to the forward side of the inner cover. The lens for the clearance lamp is applied to the hole.

While in the embodiment described above the reflection lamp 20 for forming the normal running light beams is of the projection type, it may be of the reflection type, like the lamp 30.

Further in the embodiment described above, while the clearance lamp 50 is used for the auxiliary lamp contained in the lamp chamber, any lamp other than the headlamp for forming the normal and passing light beams may be used for the auxiliary lamp. For example, a position lamp or a fog lamp may be used for the auxiliary lamp.

As seen from the foregoing description, in the vehicle headlamp assembly with an auxiliary lamp according to the present invention, a bulb for the auxiliary lamp, directed forward, is disposed in a given space located aslant on the side of the projection lens in a state such that the front end of the bulb for the auxiliary lamp projects from the hole formed in the horizontal extended part of the inner cover. This construction eliminates the need of specially increasing the size of the lamp body for containing the auxiliary lamp. Accordingly, a significant size reduction of the headlamp can be achieved.

Further, the light beams emitted from the bulb for the auxiliary lamp are guided in a given direction by the lens step area of the lens for the auxiliary lamp. Accordingly, the auxiliary lamp when lit is easily distinguished.

What is claimed is:

1. A vehicle headlamp assembly with an auxiliary lamp, comprising: a lamp body defining a lamp chamber, a transparent front cover applied to a front opening of said lamp body, a lamp for forming a normal running beam, a projection lamp including a projection lens for forming a passing beam, and said auxiliary lamp disposed side by side within said lamp chamber, a mirrored inner cover having an opening through which a front end of said projection lamp is exposed, a bulb for said auxiliary lamp supported by said lamp body and disposed at a position located aslant on a side of said projection lens when viewed from the front in a state such that said bulb is directed forward, a lower edge of said inner cover located adjacent said bulb being substantially horizontally extended to form a horizontal extended part, a hole from which a front end of said bulb for said auxiliary lamp projects being formed in said horizontal extended part, and a lens for said auxiliary lamp having a lens step area formed thereon for guiding light from said bulb in a predetermined direction mounted in said hole.

2. The headlamp assembly of claim 1, wherein said inner cover has a concave portion forming a reflector for said auxiliary lamp.

3. The headlamp assembly of claim 2, wherein, in addition to said lens step area, said lens for said auxiliary lamp has a plain area having no lens steps.

4. The headlamp assembly of claim 3, wherein, in addition to said lens step area and said plain area, said lens for said auxiliary lamp has a fisheye lens step area, said lens step area being used for forming a turning signal beam, said plain area allowing light from said bulb to pass directly therethrough, and said fisheye lens step area illuminating said concave portion of said inner cover.

5. The headlamp assembly of claim 4, wherein said inner cover for said auxiliary lens generally has the shape of an egg cut in half longitudinally.

6. The headlamp assembly of claim 1, wherein said lamp for forming a normal running beam comprises a reflection-type lamp.

7. The headlamp assembly of claim 1, wherein said lamp for forming a normal running beam comprises a projection-type lamp.

8. The headlamp assembly of claim 1, further comprising a projection lamp for forming a fog light, said auxiliary lamp being disposed between said projection lamp for forming said passing beam and said projection lamp for forming said fog light.

9. The headlamp assembly of claim 8, wherein said auxiliary lamp is disposed forward of said projection lamp for forming said fog light.

* * * * *